(12) United States Patent
Tateno

(10) Patent No.: US 8,695,492 B2
(45) Date of Patent: Apr. 15, 2014

(54) ADJUSTABLE ROTATING BLADE ASSEMBLY AVOCADO CUTTER AND PEELER

(76) Inventor: Chikara R. Tateno, Santa Cruz, CA (US)

(*) Notice: Subject to any disclaimer, the term of this patent is extended or adjusted under 35 U.S.C. 154(b) by 679 days.

(21) Appl. No.: 12/589,683

(22) Filed: Oct. 27, 2009

(65) Prior Publication Data

US 2011/0094394 A1  Apr. 28, 2011

(51) Int. Cl.
*A47J 17/02* (2006.01)
*A47J 25/00* (2006.01)

(52) U.S. Cl.
USPC ............ 99/541; 99/540; 99/545; 30/114; 30/117; 30/123.5; 30/302; 83/857

(58) Field of Classification Search
USPC .......... 99/541, 545, 540; 30/123.5, 114, 117, 30/302, 303; 83/857
See application file for complete search history.

(56) References Cited

U.S. PATENT DOCUMENTS

| | | | | |
|---|---|---|---|---|
| 24,149 A * | 5/1859 | Porter | ......................... | 30/123.5 |
| 1,495,086 A * | 5/1924 | Lambert | ..................... | 30/123.5 |
| 3,116,770 A * | 1/1964 | Tanuma | ......................... | 30/114 |
| 4,383,367 A * | 5/1983 | Mielnicki | ..................... | 30/114 |
| 5,533,442 A * | 7/1996 | Tateno | ............................ | 99/541 |
| 6,619,194 B1 * | 9/2003 | Kuan | ............................ | 99/588 |

* cited by examiner

*Primary Examiner* — Reginald L Alexander
(74) *Attorney, Agent, or Firm* — Jeffrey Hall

(57) ABSTRACT

A device for cutting, peeling and slicing avocados and other fruits and vegetables includes a handle, a frame element connected to the handle, and a rotating blade assembly operably secured to the frame. The rotating blade assembly has one or more cutting elements for cutting, slicing and peeling. The rotating blade assembly is operably secured to the frame by a shaft allowing both movement and positioning of the blade assembly at various angles in relation to the frame, and fixing the rotating blade assembly in a desired position for use.

12 Claims, 6 Drawing Sheets

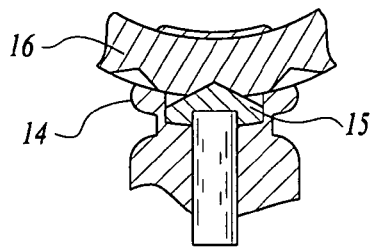
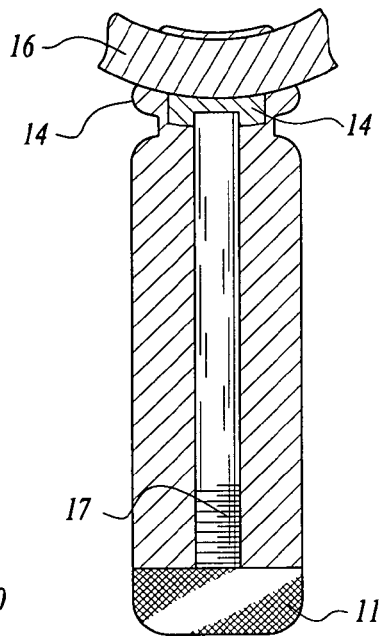
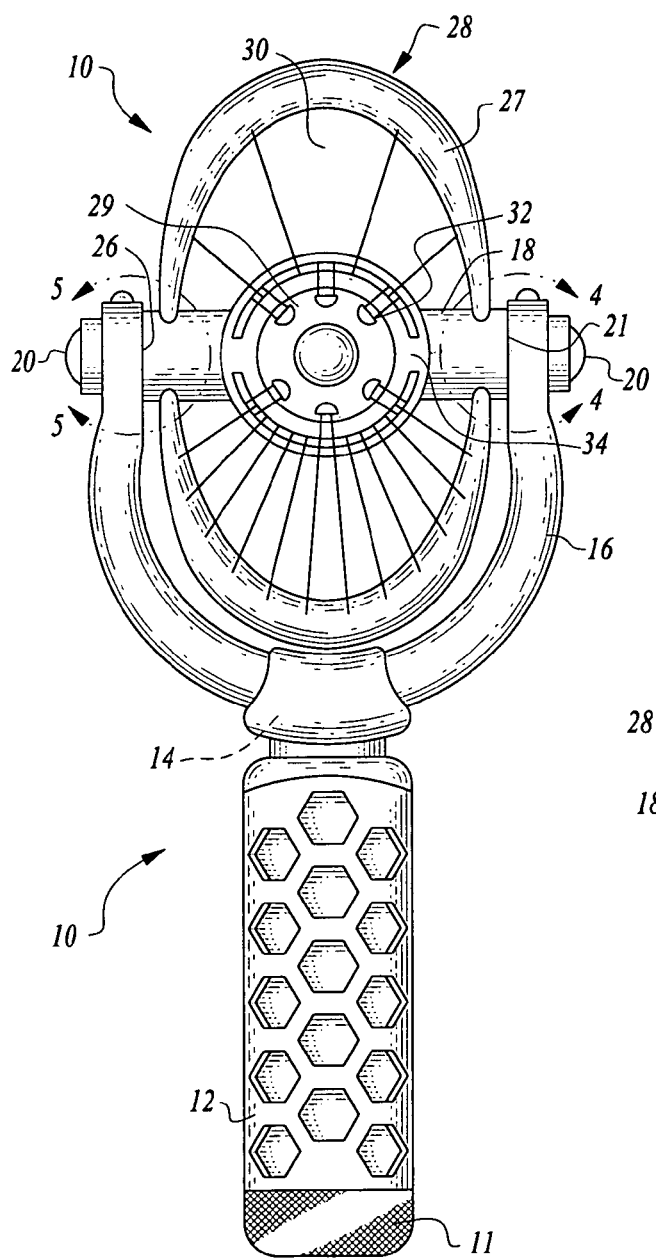
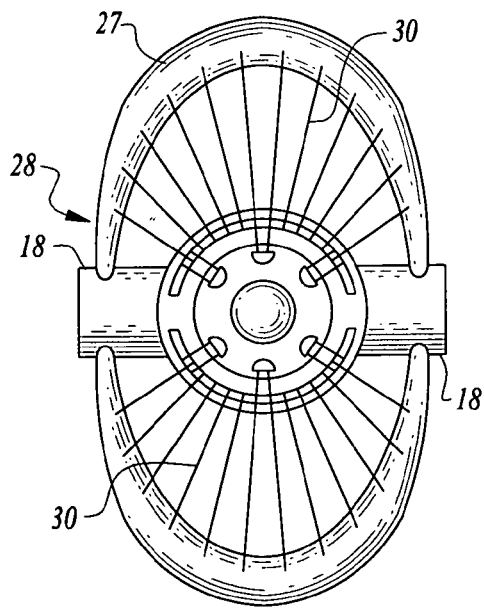
Fig. 3A
Fig. 3
Fig. 2
Fig. 1

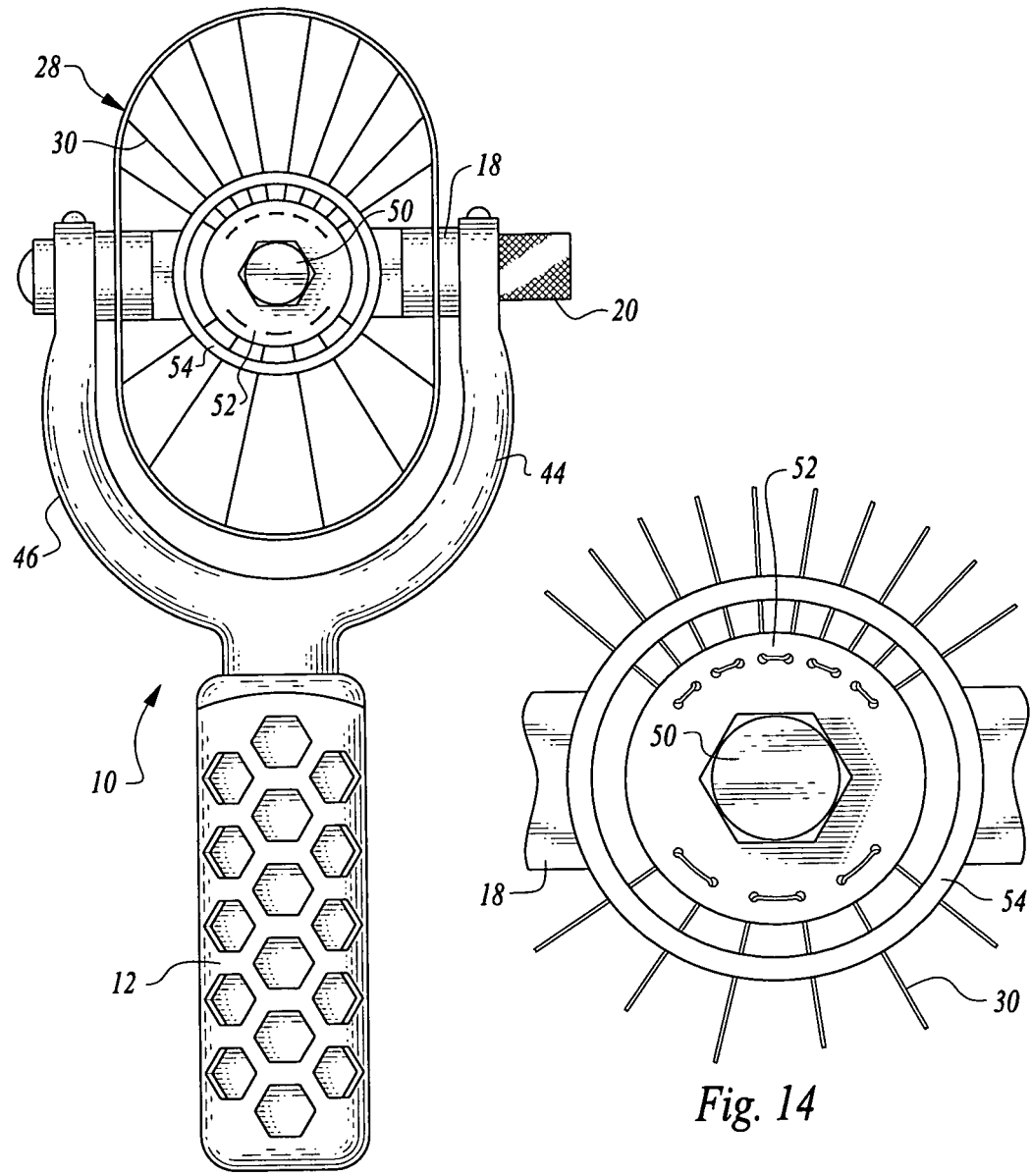
Fig. 13
Fig. 14
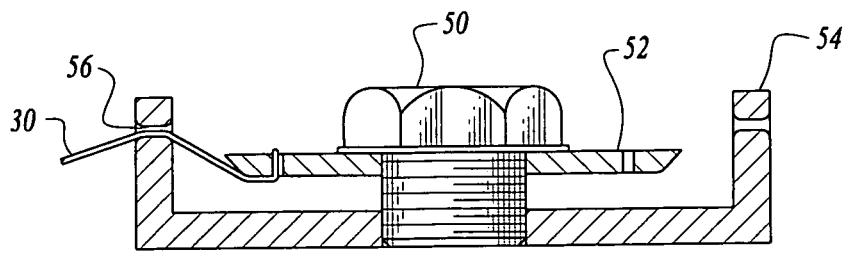
Fig. 15

ADJUSTABLE ROTATING BLADE ASSEMBLY AVOCADO CUTTER AND PEELER

BACKGROUND OF THE INVENTION

1. Technical Field

This invention relates to devices for cutting and peeling avocados and other fruits and vegetables, and more particularly to a rotating blade assembly avocado cutter and peeler having an adjustable and rotating cutting assembly in operable combination with a handle element.

2. Background Art

Various devices have been proposed and implemented for cutting, peeling, and slicing avocados and other fruits and vegetables. Although prior devices have been adapted and used for various purposes in connection with cutting, peeling and slicing avocados, and other fruits and vegetables, applicant is not aware of any device which allow for the cutting and slicing portion of the device to be rotated and adjusted as desired, and then fixed in that position, so as to allow the cutting, peeling and slicing of the avocado, or other fruit or vegetable, to be made at a desired angle by use of an adjustable rotating cutting and slicing assembly.

The present invention provides a device for cutting, peeling and slicing avocados, and other fruits and vegetables, which is easy to use and operate, and is highly efficient. The device has a handle and a cutting and slicing blade assembly which may be adjusted by rotating the blade element to a desired angle. The rotating blade assembly may then be secured in a desired position for cutting, peeling and slicing operations. This allows the user to cut, peel or slice the avocado, or other fruit or vegetable at different angles and positions simply by adjusting the blade element in relation to the handle.

Accordingly, the primary object of the present invention is to provide an adjustable rotating blade assembly avocado cutter, peeler, and slicer which is easy to use for cutting, peeling or slicing avocados and other fruits and vegetables. The rotating blade assembly of the present invention may be easily positioned and secured in different angular positions in relation to the handle, and is very easy to use and efficient in operation. Different rotating blade assemblies may be used with variably spaced cutting blades or wires, and different rotating blade assemblies may be used allowing for a wide variety of cutting capabilities.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF SUMMARY OF THE INVENTION

To achieve the foregoing objects, and in accordance with the purpose of the invention as embodied and broadly described herein, a device for cutting, peeling and slicing avocados and other fruits and vegetables is provided having a handle, a frame element connected to the handle, and a rotating blade assembly operably secured to the frame. The rotating blade assembly has one or more cutting elements for cutting, slicing and peeling. The rotating blade assembly is operably secured to the frame by a shaft or pin assembly allowing both movement and positioning of the blade assembly at various angles in relation to the frame.

In another embodiment the rotating blade assembly is secured directly to an end portion of the handle without the use of a separate frame. In this embodiment, one end of handle is configured to receive and position the rotating blade assembly.

BRIEF DESCRIPTION OF THE DRAWINGS

The accompanying drawings, which are incorporated in and constitute a part of the specification, illustrate a preferred embodiment of the invention and, together with a general description given above and the detailed description of the preferred embodiment given below, serve to explain the principles of the invention.

FIG. 1 shows the adjustable rotating blade assembly for cutting, peeling and slicing avocados and other fruits and vegetables, according to the invention.

FIG. 2 shows the rotating cutting blade assembly detached from the handle and frame, according to the invention.

FIG. 3 shows a preferred handle adjustment knob mechanism, according to the invention.

FIG. 3a shows a tri-angulated shaped fastener used to secure the frame element to the handle, according to one embodiment of the invention.

FIG. 13 shows an embodiment of the rotating blade assembly using a tension wire anchor ring and wire tension ring to secure and position the cutting blades or wires, according to the invention.

FIG. 14, shows the wire anchor ring, tension ring, and bolt, securing the cutting blades or wires of the embodiment seen in FIG. 13, according to the invention.

FIG. 15, shows a sectional view of the tension wire anchor ring and tension wire ring of the embodiment seen in FIG. 13, according to the invention.

DETAILED DESCRIPTION OF THE INVENTION

Figure 4:
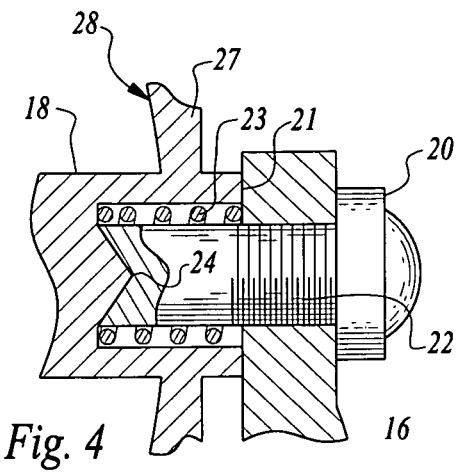
FIG. 4 shows a preferred fastener for the shaft and cutting blade assembly, according to the invention.

Reference will now be made in detail to the present preferred embodiments of the invention as illustrated in the accompanying drawings.

In accordance with the present invention, as seen in FIG. 1, there is provided in a preferred embodiment of the invention, a device 10, for cutting, peeling and slicing avocados and other fruits and vegetables having a handle 12, a frame element 16, connected to handle 12, and a rotating blade assembly 28, operably secured to the frame element 16. The rotating blade assembly 28, has one or more cutting elements 30, for cutting, slicing and peeling a fruit or vegetable, such as an avocado. The rotating blade assembly 28, is operably secured to the frame 16, by a shaft or pin assembly 18, allowing both movement and positioning of the blade assembly 28, at various angles in relation to the frame 16. Rotating blade assembly 28, may be easily removed and changed with other rotating blade assembly configurations, as illustrated, for example, in the various figures.

Figure 8:
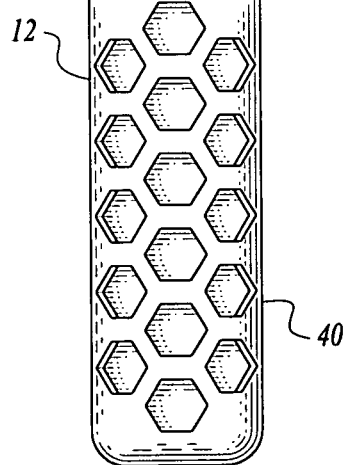
FIG. 8 shows another embodiment of the invention where the handle and frame are configured as one-piece, eliminating a separate frame element, according to the invention.
Figure 20:
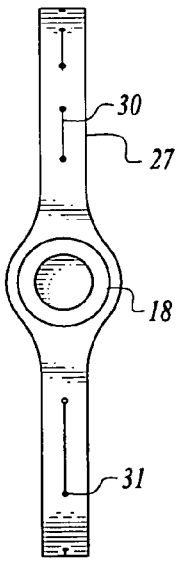
FIG. 20, shows a view of apertures 31, positioned on rotating blade assembly frame 27, used in the embodiment seen in FIG. 13, according to the invention.

In another embodiment the rotating blade assembly 28, is secured directly to an end portion of the handle without the use of a separate frame. In this embodiment, as seen in FIGS. 8 and 20, one end of handle 12, is configured to receive and position the rotating blade assembly.

In FIG. 1, a preferred embodiment of device 10, for cutting, peeling and slicing avocados and other fruits and vegetables is shown having handle 12, which may be secured to frame element 16, by fastening screw 17, combined with fastener 14, or other fastening mechanisms such as a bolt, nut, flange, key or the like. Both a broadened version of fastener 14 and a triangulated version 15, are illustrated in FIG. 3. Handle 12, may be composed of metal, plastic, wood, or any other durable resilient material. Handle 12, is preferably linked to fastener 15, and may include twist knob 11, allowing for adjustments and tightening of fastener 14, to frame 16. Alternatively, handle 12 may be provided without twist knob 11. In other embodiments, frame element 16, may be eliminated and handle 12, configured as one piece with one end configured to secure and position rotating blade assembly 28.

Rotating blade assembly 28, is preferably operably secured to the frame element 16, by shaft 18, and fasteners 20, which may be fastening bolts, nuts, screws, keys, pins, clamps, or any other fastening device well known in the art. Fasteners 20, may be configured to engage with a tightening assembly with grooved surface 22, on one side, and a end of shaft 18, which may be substantially pointed 24, at one end, and have a second end 26, knobbed. However, this is only one of many configurations contemplated as the functional requirements are to allow shaft 18, to secure cutting blade assembly 28 to frame 16, allowing the rotating blade assembly to be rotated into any position the user desires, and to allow cutting blade assembly 28, to be secured in a desired angular position by fasteners 20. As noted, rotating blade assembly 28, may be removed from the frame or handle, and changed with other configurations of the rotating blade assembly as desired, allowing for a wide variety of different cutting configurations to be used.

Preferably rotating blade assembly 28, is operably secured to the frame 16, by a shaft or pin assembly 18, allowing both movement and positioning of the blade assembly 28, at various angles in relation to the frame 16. This may be achieved by a wide variety of fastening means, such as fasteners 20, which may be bolts, nuts, screws, keys, clamps, or other fastening, such as spring mechanism 23, means well known in the art.

Rotating blade assembly 28, also referred to herein in different embodiments as rotating cutting assembly and rotating cutting wheel assembly, has one or more cutting elements 30, for cutting, slicing and peeling a fruit or vegetable, such as an avocado. Cutting elements 30, may be provided as wires, blades, or any surface which can cut the fruit or vegetable. The cutting elements may be composed of metal, plastic or other durable resilient material and secured to frame 27, or other surface, by nuts, bolts, screws, adhesives, tension mechanisms or the like. The rotating blade assembly 28, has frame 27, for securing the cutting elements 30, and hub 29, and for positioning and securing cutting elements 30, and shaft 18. Frame 27, may be composed of metal, plastic, wood or any other durable resilient material. The cutting elements 30, may be secured to the hub by fastening knobs 32, or other fastening means well known in the art, such as adhesives, welds, nuts, screws, tightened channels or apertures with mechanical fasteners, or the like.

With reference to FIG. 2, the rotating blade assembly 28, is shown detached from handle 12. Preferably frame 27, of rotating blade assembly 28, is configured in a curved in an oval or elliptical shape as shown, or frame 27, may be configured as a rectangle with rounded corners, spherical, rectangular in shape or any other chosen configuration. Shaft 18, is shown detached from frame element 16, and in other embodiments may be directly secured to a forked or curved handle. Alternative means of securing frame 27, to either frame element 16, or directly to handle 12, may be by use of a pin, clip, key, axle or the like. The critical functional attribute of any attachment means is that it allows cutting blade assembly 28, to be rotated in various positions, and then secured in a desired position for cutting, peeling or slicing a fruit or vegetable, such as an avocado.

It may be desired, in some embodiments, to have shaft 18, or its functional equivalent extend only partially through cutting blade assembly 28, in which case typically the shaft would be in two parts, or in other embodiments shaft 18 extends all the way through cutting blade assembly 28, as a single shaft. As seen in FIG. 1, a receiving aperture 21, to secure and receive shaft 18, may be positioned in frame element 16, or in alternative embodiments directly in a curved portion of a modified handle.

In FIG. 3, a preferred embodiment of components of twist knob 11, and fastener 14, are shown, where twist knob screw 11, preferably has grooves 17, and engages with fastener 14 securing handle 12, to frame element 16. Of course many other fastening means may be used in alternative embodiments such as a tri-angulated fastener 15, seen in FIG. 3a, or by welding handle 12, to frame element 16, or using clamps, or adhesives, or single piece molds where handle 12, is formed as a single unit with frame element 14, or any other fastening means that securely positions handle 12, in a desired position on frame element 14.

With reference to FIG. 4, a preferred embodiment of fastening means 20, is shown, where fastener 20, is combined with a grooved surface 22, allowing for tightening of shaft 18, against frame element 16. In FIG. 3, shaft 18, is shown with a shaft end 24, which may be substantially pointed, or in other embodiments end 24, may be rounded, rectangular, square or any other chosen configuration, for engagement with fastener 20. In other embodiments, grooved surface 22, may be replaced by other tightening mechanisms such as a spring, washer, tightening nut or the like. It is understood that many other type of fastening means and combinations may be used to secure shaft 20, to frame 16, as the functional fastening requirement for operable engagement is to allow rotation of shaft 20, thereby allowing the rotation of cutting blade assembly 28, while allowing the user to secure and position cutting assembly 28, in a desired angular relation to frame 16, and handle 12.

Figure 5:
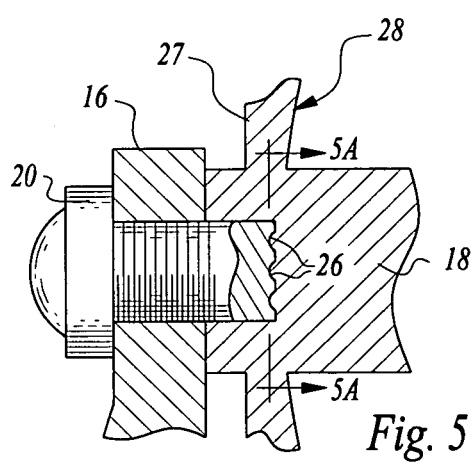
FIG. 5 shows a sectional view of the shaft secured with a fastener, according to the invention.
Figure 5A:
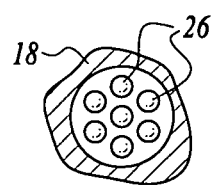
FIG. 5a shows an end of the shaft having knobs 26, according to one embodiment of the invention.

FIG. 5 shows a sectional view of shaft 18, secured to frame element 16, by fastener 20, according to one embodiment of the invention. Cutting blade assembly frame 27, of cutting blade assembly 28 is shown secured thereto. In FIG. 5a, an embodiment of shaft 18, is shown where fastener 20 has a plurality of knobs 26, for fastening to shaft 18. However, as noted above, other fastening means well known in the art may also be used for fastening shaft to cutting blade assembly 28, such as bolts, nuts, screws, keys, clamps, or other fastening mechanisms, such as spring mechanism 23, well known in the art.

Figure 6:
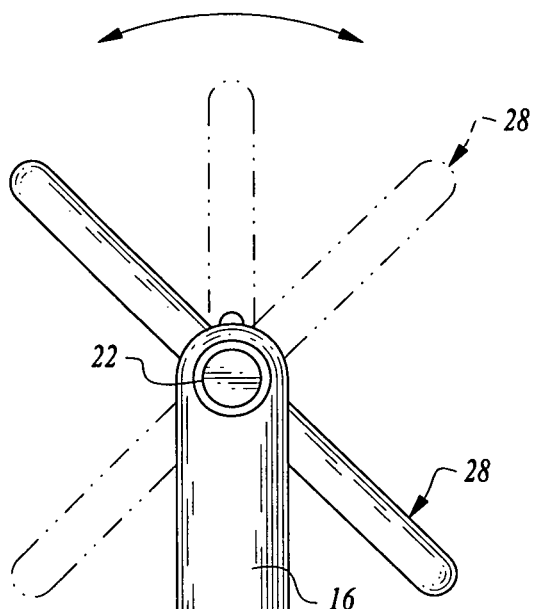
FIG. 6 shows the rotating cutting blade assembly positioned at a selected angle in relation to the frame and handle, according to the invention.

Referring now to FIG. 6, the cutting, peeling and slicing device 10, for cutting, peeling and slicing avocados and other fruits and vegetables is shown with rotating cutting blade assembly 28, shown in a different cutting angle than that shown in FIG. 1. It is noted, that rotating cutting blade assembly or rotating cutting wheel assembly 28, may be rotated and fixed at any selected angle for cutting, peeling or slicing the fruit or vegetable.

Figure 7:
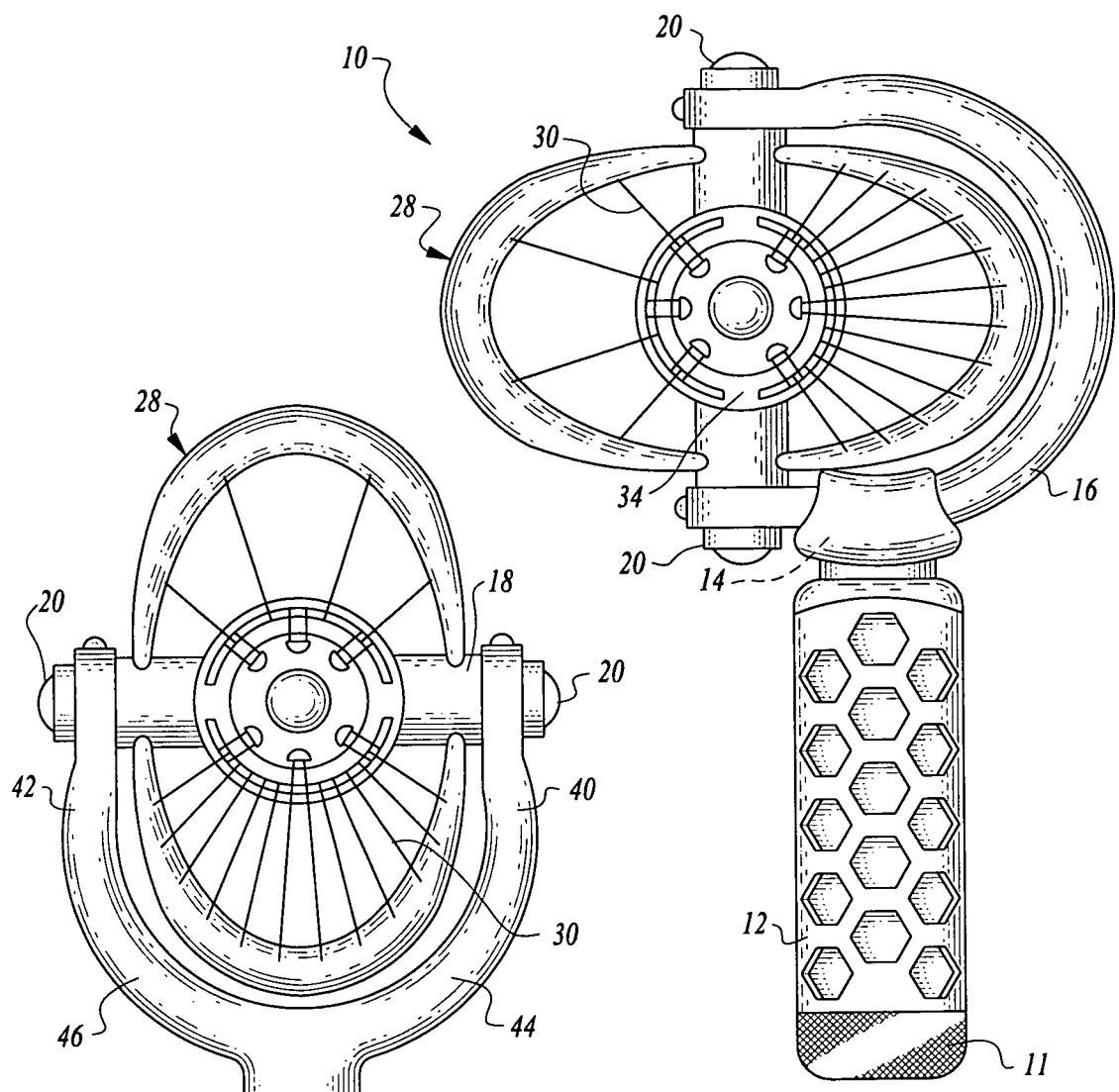
FIG. 7 shows the rotating blade assembly for cutting, peeling and slicing avocados and other fruits and vegetables, illustrating how handle 12, may be moved and positioned on frame 16, as desired, according to the invention.

In FIG. 7, device 10, for cutting, peeling and slicing avocados and other fruits and vegetables is shown having handle 12, moved on frame element 16, to a different position as that shown in FIG. 1. Again, handle 12, which may be secured to frame element 16, by fastening screw with grooves 17, combined with fastener 14, or other fastening mechanisms such as a bolt, nut, flange, key or the like, is easily repositioned on frame element 16, if the user desires to cut, peel or slice with cutting assembly 28, in a different position. Accordingly, it is seen that both cutting assembly 28 may be rotated and positioned in relation to handle 12, as seen in FIG. 6, and that handle 12, may be positioned at different places on frame 16.

In another preferred embodiment, as seen in FIG. 8, handle 12, is configured having an elongated first end 40, configured to be held in a human hand, and a second end 42, having two arms, 44, and 46, in between which is positioned cutting blade assembly 28. Arms 44, and 46, may form a substantially U-shaped space as shown in FIG. 6, or be spaced and configured differently, for example, be formed parallel to one another, or rounded, or any other configuration, the functional goal of any configuration however, is to allow the rotation of cutting blade assembly 28, to rotate freely therein, and to allow positioning of cutting blade assembly 28, by fastener 20, either being loosened or tightened against shaft 18. Although this embodiment is functionally equivalent to the embodiment illustrated in FIG. 1, in this embodiment frame element 16, is eliminated and handle 12, is configured and formed with arms 42 and 44.

Figure 9:
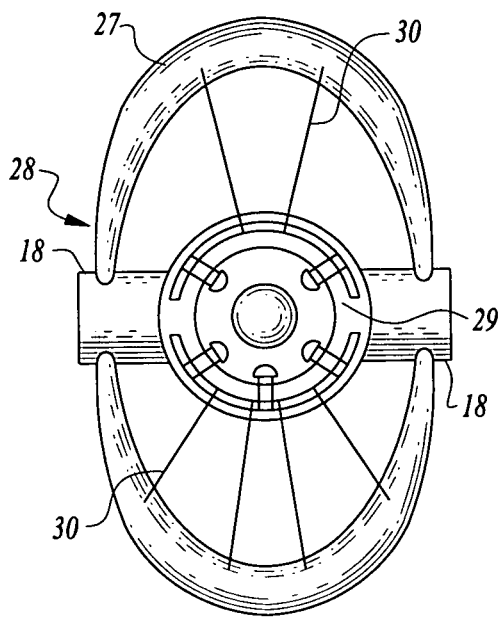
FIG. 9 shows an embodiment of rotating blade assembly with blades spaced differently on the top and bottom portions of the assembly, according to the invention.
Figure 10:
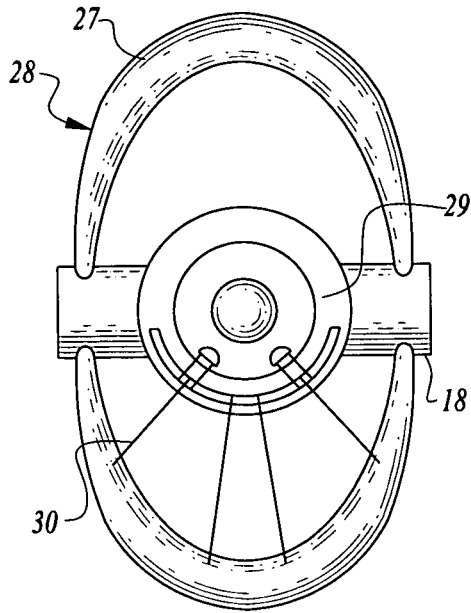
FIG. 10 shows an embodiment of rotating blade assembly with blades placed in one portion of the assembly while another portion does not have blades, according to the invention.

FIGS. 9-12, show various embodiments of rotating blade assembly 28. In FIG. 9, an embodiment of rotating blade assembly 28, has blades 30, spaced differently on the top and bottom portions of the assembly. This allows for different sized cuts depending upon how the rotating blades assembly 28 is rotated or positioned With reference now to FIG. 10, an embodiment of rotating blade assembly 28, is shown with blades placed in one portion of the assembly while another portion does not have blades. Again, this allows for variation in cuts and slices depending upon the rotation and positioning of rotating blade assembly 28.

Figure 11:
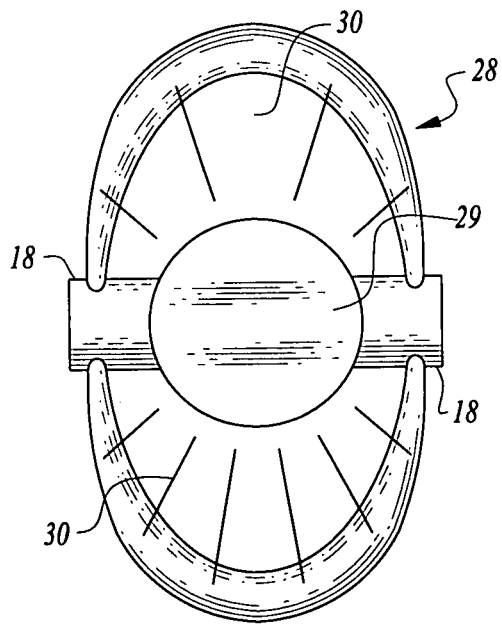
FIG. 11 shows an embodiment of rotating blade assembly with blades which are only secured to frame 27, and not to the central portion of the assembly, according to the invention.

In FIG. 11, an embodiment of rotating blade assembly 28, is shown where cutting blades 30, are only secured to frame 27, and not to the central portion of the assembly, according to another embodiment of the invention. Preferably in this embodiment, the cutting blades are composed of a plastic, but as noted previously, other durable resilient materials may be used.

Figure 12:
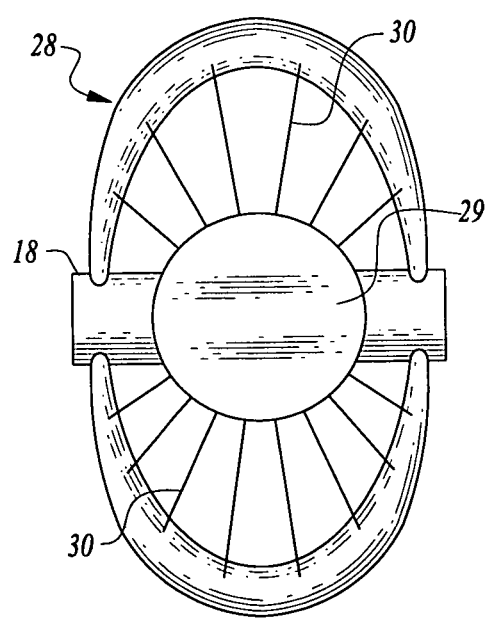
FIG. 12 shows an embodiment of rotating blade assembly with blades secured to a solid central hub, according to the invention.

Referring now to FIG. 12, shows an embodiment of rotating blade assembly 28, with cutting blades 30, secured to a solid central hub 29, according to the invention.

FIGS. 13-20, illustrate another preferred embodiment of the invention where a wire tension ring is used to secure cutting blades 30, to rotating blade assembly 28. In this embodiment, a bolt holds a wire anchor ring 52 and wire tension ring in place positioning and securing cutting blades 20, to rotating blade assembly 28. In FIG. 13, handle 12 has arms 44 and 46, to position and secure rotating blade assembly 28, however, in alternative embodiments a separate frame may be secured to handle 12, to position and secure rotating blade assembly 28.

With reference now to FIG. 14, details for the tension ring mechanism shown is FIG. 13 is detailed. Cutting blades or wires 30, are secured in place by a wire anchor ring 52 operably secured to nut or bolt 50 and operably linked to wire tension ring 54. This mechanism may be pushed into place by a hex nut or bolt 50, and cutting blades or wires 30, may be further secured by adhesives to the rotating blade assembly.

In FIG. 15, further details the tension ring system for attaching cutting blades or wires 30. Bolt or hex nut 50, is seen securing wire anchor ring 52, and tension ring 54, with aperture 56, to hold and secure cutting blades or wires 30. Preferably the edges of the wire tension ring 54, which come in contact with cutting blades or wires 30, are rounded to prevent breakage.

Figure 18:
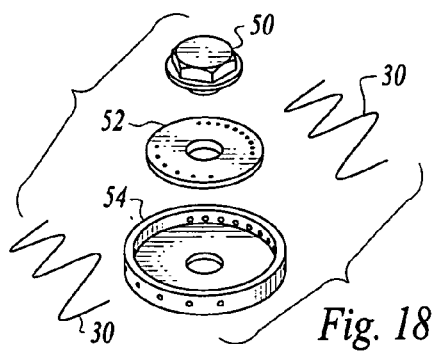
FIG. 18, shows a preferred embodiment of wire tension ring 54, used in the embodiment seen in FIG. 13, according to the invention.
Figure 17:
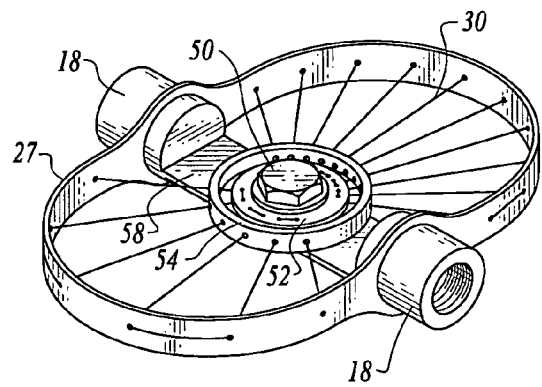
FIG. 17, shows a preferred embodiment of shaft 18, used in the embodiment seen in FIG. 13, according to the invention.
Figure 16:
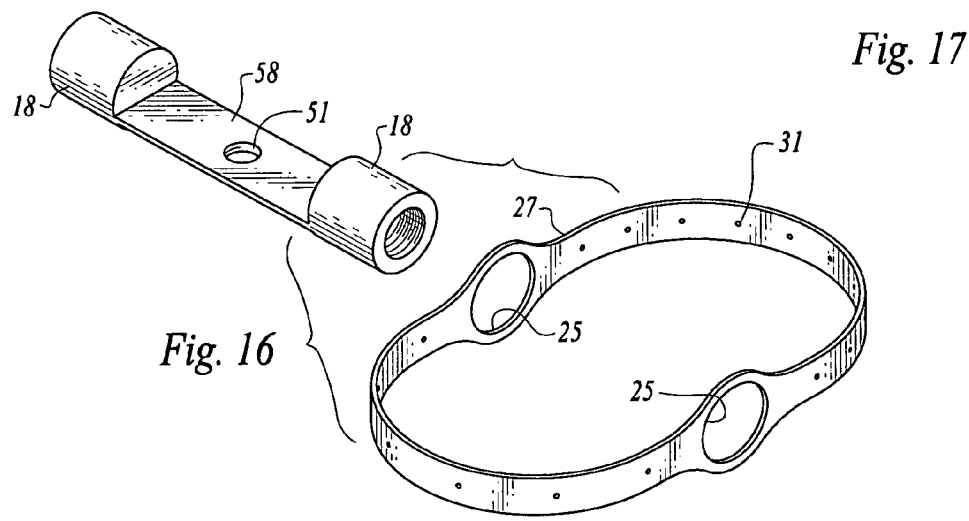
FIG. 16, shows the cutting blade assembly frame without blades or cutting wires with shaft 18, of the embodiment seen in FIG. 13, according to the invention.

Referring now to FIG. 16, frame 27, is shown as a one-piece unit with apertures 25, to receive shaft 28, in this embodiment with notch or groove 58, with aperture 51, for bolt or hex nut 50, or other fastening mechanism, such as a screw, key, shaft or the like, and smaller apertures 31, for receiving cutting blades or wires 30. FIG. 17, shows shaft 18, for positioning of the wire anchor ring 52, and wire tension ring 54. Preferably, wire tension ring 54, is fixed to the notch or groove area 58, of shaft 18, best seen in FIG. 16. FIG. 18, shows the wire tension ring 54, with wire anchor ring 52, and bolt or hex nut 50, or other fastening means such as screws, shaft, key, adhesive or the like may be alternatively used.

Figure 19:
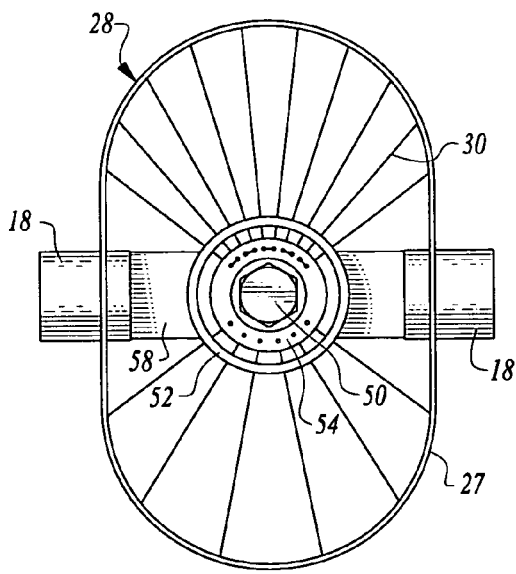
FIG. 19, shows a preferred embodiment of rotating blade assembly 28, used in the embodiment seen in FIG. 13, according to the invention.

In FIG. 19, rotating blade assembly 28, is shown detached from handle 12. In this embodiment, wire tension ring 54, is used with hex nut or bolt 50, to secure wires in place in the rotating cutting blade assembly. It is seen in that cutting blades or wires 30 are spaced differently on the different sides of shaft 18, allowing for different thickness of slices and cuts. As with the other rotating blade configurations disclosed herein, any rotating blade assembly 28, may be easily removed from the handle 12, and replaced with a differently configured rotating blade assembly, allowing for a wide variety of cutting, peeling, and slicing capabilities.

In FIG. 20, apertures 31, are shown for cutting blades or wires 30, as well as how the positioning of shaft 18, on cutting blades assembly frame 27, is preferably configured. Of course, various sized apertures may be needed depending upon the size and shape or the cutting blade or wire used, and the spacing of aperture 31, chosen to space the cutting blades and wires 30 as desired.

In operation and use, adjustable rotating blade assembly 10, for cutting, peeling or slicing avocados or other fruits and vegetables, is very easy to use, efficient, and reliable. Adjustable rotating cutting blade assembly 10, may be used for cutting peeling or slicing fruits and vegetables and is especially useful for cutting, peeling or slicing avocados, and is inexpensive to manufacture and easy to use. Adjustable rotating blade assembly 10, may be provided in a wide variety of different sizes and configurations. Further, different rotating blade assemblies may be used and substituted on the handle. This allows the user to have a wide range of cutting, peeling, and slicing options. Additionally, as seen in the FIGS. 1,2,7, 8,13,17, and 19, the spacing and number of the cutting blades or wires in the rotating blade assembly preferably differ, but alternatively may be equal, on the upper portion from the lower portion, that is, either more or less blades and wires are typically provided on one portion allowing for each rotating blade assembly to provide different size slices and cuts.

Additional advantages and modification will readily occur to those skilled in the art. The invention in its broader aspects is, therefore, not limited to the specific details, representative apparatus and illustrative examples shown and described. Accordingly, departures from such details may be made without departing from the spirit or scope of the applicant's general inventive concept.

What is claimed is:

1. An avocado cutting and peeling device, comprising:
   a handle having a fastener mechanism for receiving, securing, and removing a rotatable frame element; said frame element being secured to said handle; and
   an interchangeable rotating blade assembly operably secured to said frame element and including positioning mechanisms so as to allow for the interchangeable rotating blade assembly to be rotated into any chosen position and then secured in that position; said interchangeable rotating blade assembly having a plurality of cutting elements for cutting, slicing and peeling said avocado allowing for two or more functions, such as cutting, slicing, or peeling to be performed by said interchangeable rotating blade assembly; the interchangeable rotating blade assembly may be changed with other rotating blade assemblies which have different configurations and orientations of cutting blades, providing for a wide variety of cutting, slicing, and peeling operations with a single device.

2. The avocado cutting and peeling device of claim 1, wherein said rotating blade assembly includes a shaft for operable engagement with said frame element.

3. The avocado cutting and peeling device of claim 1, wherein said frame element includes two receiving apertures to receive said shaft.

4. The avocado cutting and peeling device of claim 1, wherein said plurality of cutting elements comprise a plurality of cutting wires.

5. The avocado cutting and peeling device of claim 1, wherein said plurality of cutting elements comprise a plurality of cutting blades.

6. The avocado cutting and peeling device of claim 4, wherein said plurality of cutting elements comprise a plurality of cutting wires, with one half of the cutting wires being spaced differently from one another than the other half.

7. The avocado cutting and peeling device of claim 5, wherein said plurality of cutting elements comprise a plurality of cutting blades, with one half of the cutting blades being spaced differently from one another than the other half.

8. The avocado cutting and peeling device of claim 4, wherein said cutting elements comprise a plurality of cutting wires, and including a space on the rotating blade assembly having no cutting elements allowing for a different cutting configuration by the rotating blade assembly.

9. The avocado cutting and peeling device of claim 4, wherein said plurality of cutting elements comprise a plurality of un-evenly spaced cutting wires and including a space on the rotating blade assembly having no cutting elements allowing for a different cutting configuration by the rotating blade assembly.

10. The avocado cutting and peeling device of claim 1, wherein said plurality of cutting elements extend from said frame to a point prior to a hub, so that a space is formed between an end of said cutting elements and said hub, allowing for a different cutting configuration by the rotating blade assembly.

11. A device for cutting, slicing and peeling fruits and vegetables, comprising:
    a rotating cutting wheel assembly operably secured to a handle having a fastener mechanism; said rotating cutting wheel assembly having a plurality of cutting elements secured thereto and positioned for cutting and peeling fruits and vegetables, said rotating cutting wheel assembly being interchangeable with different configurations of said cutting wheel assembly allowing for two or more functions, such as cutting, slicing, or peeling to be performed, assemblies, the rotating cutting wheel assembly includes a positioning mechanism so as to allow for the interchangeable rotating cutting wheel assembly to be rotated into any chosen position and then secured in that position, allowing for a wide variety of cutting, slicing and peeling operations to be performed, said plurality of cutting elements are configured and positioned in the rotating cutting wheel assembly in variably spaced relation to one another for cutting and peeling fruits and vegetables.

12. The device of claim 11, wherein said plurality of cutting elements comprise a plurality of cutting wires, with one half of the cutting wires being spaced differently from one another than the other half.

* * * * *